United States Patent
Fontana et al.

(10) Patent No.: US 8,427,815 B2
(45) Date of Patent: Apr. 23, 2013

(54) PLATFORM FOR A POWER DISTRIBUTION SYSTEM

(75) Inventors: Edward C. Fontana, Rockwall, TX (US); Paul Smith, Plano, TX (US); William C. England, II, Royse City, TX (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 12/775,796

(22) Filed: May 7, 2010

(65) Prior Publication Data

US 2011/0141663 A1 Jun. 16, 2011

Related U.S. Application Data

(60) Provisional application No. 61/308,215, filed on Feb. 25, 2010, provisional application No. 61/287,322, filed on Dec. 17, 2009, provisional application No. 61/287,057, filed on Dec. 16, 2009.

(51) Int. Cl.
*H02B 1/26* (2006.01)
*H05K 13/00* (2006.01)

(52) U.S. Cl.
USPC .......... 361/624; 361/601; 361/622; 361/625; 361/641; 361/648

(58) Field of Classification Search .................. 361/601, 361/622, 625, 641, 624, 648
See application file for complete search history.

(56) References Cited

U.S. PATENT DOCUMENTS

| | | | | |
|---|---|---|---|---|
| 2,625,591 A | * | 1/1953 | George | 361/601 |
| 2,988,655 A | * | 6/1961 | Rudolph et al. | 307/114 |
| D222,362 S | * | 10/1971 | Williams | D13/139.4 |
| 3,631,324 A | * | 12/1971 | Jones | 361/625 |
| 3,786,312 A | * | 1/1974 | Roussard | 361/643 |
| 4,318,156 A | * | 3/1982 | Gallagher | 361/647 |
| 4,390,926 A | * | 6/1983 | Hart | 361/625 |
| 4,425,598 A | * | 1/1984 | Pyle | 361/648 |
| 5,035,630 A | * | 7/1991 | Norsworthy | 439/92 |
| 5,212,623 A | * | 5/1993 | Wilson et al. | 361/625 |
| 5,311,397 A | * | 5/1994 | Harshberger et al. | 361/679.58 |
| 5,359,540 A | * | 10/1994 | Ortiz | 700/295 |
| D356,292 S | * | 3/1995 | Kelly et al. | D13/123 |
| 5,403,679 A | * | 4/1995 | Stone | 429/99 |
| 5,616,968 A | * | 4/1997 | Fujii et al. | 307/66 |
| 5,726,507 A | * | 3/1998 | Tipton | 307/147 |
| 5,784,249 A | * | 7/1998 | Pouliot | 361/622 |
| 5,821,636 A | * | 10/1998 | Baker et al. | 307/70 |
| 5,905,630 A | * | 5/1999 | Wetterling | 361/625 |
| 6,205,029 B1 | * | 3/2001 | Byrne et al. | 361/724 |
| 6,301,095 B1 | * | 10/2001 | Laughlin et al. | 361/624 |
| 6,657,123 B2 | * | 12/2003 | Moore | 174/50 |
| 6,831,225 B2 | * | 12/2004 | Chandler | 174/50 |
| 6,862,187 B2 | * | 3/2005 | Robbins et al. | 361/725 |
| 6,937,461 B1 | * | 8/2005 | Donahue, IV | 361/622 |
| 6,947,287 B1 | * | 9/2005 | Zansky et al. | 361/731 |
| 7,099,151 B2 | * | 8/2006 | Jones et al. | 361/679.02 |
| 7,209,357 B2 | * | 4/2007 | Zansky et al. | 361/731 |

(Continued)

*Primary Examiner* — Anatoly Vortman
(74) *Attorney, Agent, or Firm* — Dolly Wu; Armstrong Teasdale LLP

(57) ABSTRACT

A power distribution system comprising a platform having one or more electrical connections each with cabinet connection contacts and one or more receptacles in an outer surface of the platform. Each receptacle is configured to hold one or more electrical over-current protection devices that route electrical power to the cabinet connection contacts.

12 Claims, 7 Drawing Sheets

U.S. PATENT DOCUMENTS

| | | | |
|---|---|---|---|
| 7,215,535 B2 * | 5/2007 | Pereira | 361/624 |
| 7,324,006 B2 * | 1/2008 | Godard | 340/664 |
| 7,324,332 B1 * | 1/2008 | Shelton | 361/634 |
| 7,365,964 B2 * | 4/2008 | Donahue, IV | 361/622 |
| 7,397,652 B2 * | 7/2008 | Price et al. | 361/643 |
| 7,397,654 B2 * | 7/2008 | Mori | 361/679.01 |
| 7,400,493 B2 * | 7/2008 | Ewing et al. | 361/623 |
| D609,182 S * | 2/2010 | Ladewig et al. | D13/118 |
| 7,719,835 B1 * | 5/2010 | Schluter | 361/695 |
| 7,791,864 B2 * | 9/2010 | Matyas et al. | 361/630 |
| 7,817,405 B2 * | 10/2010 | Neumann et al. | 361/625 |
| 7,848,085 B2 * | 12/2010 | Gerber | 361/625 |
| 7,869,211 B2 * | 1/2011 | Kunkle | 361/695 |
| 8,084,686 B2 * | 12/2011 | Ladewig et al. | 174/50 |
| 2001/0026436 A1 * | 10/2001 | Tanzer et al. | 361/610 |
| 2002/0193015 A1 * | 12/2002 | Milan | 439/752.5 |
| 2003/0043561 A1 * | 3/2003 | Brooks | 361/796 |
| 2004/0008493 A1 * | 1/2004 | Robbins et al. | 361/725 |
| 2004/0184242 A1 * | 9/2004 | Jones et al. | 361/724 |
| 2005/0068716 A1 * | 3/2005 | Pereira | 361/624 |
| 2005/0094357 A1 * | 5/2005 | Ewing et al. | 361/626 |
| 2005/0122650 A1 * | 6/2005 | Beasley et al. | 361/90 |
| 2005/0170678 A1 * | 8/2005 | Donahue, IV | 439/214 |
| 2007/0123108 A1 * | 5/2007 | Ivanova et al. | 439/620.22 |
| 2007/0217128 A1 * | 9/2007 | Johnson, Jr. | 361/622 |
| 2007/0253181 A1 * | 11/2007 | Bersiek | 361/828 |
| 2009/0109605 A1 * | 4/2009 | Blake | 361/625 |
| 2010/0123997 A1 * | 5/2010 | Gerber | 361/625 |
| 2011/0141664 A1 * | 6/2011 | Fontana et al. | 361/601 |
| 2011/0141666 A1 * | 6/2011 | Fontana et al. | 361/624 |

* cited by examiner

1

PLATFORM FOR A POWER DISTRIBUTION SYSTEM

CROSS-REFERENCE TO RELATED APPLICATION

This application claims the benefit of U.S. Provisional Application Ser. No. 61/308,215, filed on Feb. 25, 2010, to Edward C. Fontana, et al. entitled, "POWER DISTRIBUTION PLATFORM;" Provisional Application Ser. No. 61/287,322, filed on Dec. 17, 2009, to Roy Davis, et al. entitled, "HYBRID ARCHITECTURE FOR DC POWER PLANTS;" and Provisional Application Ser. No. 61/287,057, to filed on Dec. 16, 2009 to Edward C. Fontana, et al. entitled, "A FLOOR MOUNTED DC POWER DISTRIBUTION SYSTEM," which are all commonly assigned with this application and incorporated herein by reference in their entirety.

TECHNICAL FIELD

This application is directed, in general, to a power distribution system and, more specifically, to a power distribution platform and method of installing the power distribution system having such a platform.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

Telecommunication sites are evolving into large data centers, making extensive use of many similar configurations of server equipment. The Green Grid consortium has suggested that 48VDC is the most efficient and cost effective way to power such equipment, and, provide the highest availability and reliability of reserve power in case of utility grid failure. Present DC distribution and installation practices, however, can be time consuming, have high labor costs, and require large amounts of copper cabling with its associated overhead support structures, thereby further increasing the costs of such installations.

There is a long-felt need to more efficiently install and distribute DC power to server equipment at reduced labor and material costs.

SUMMARY

One embodiment provides a power distribution system. The system comprises a platform having one or more electrical connections each with cabinet connection contacts. The system also comprises one or more receptacles in an outer surface of the platform. Each receptacle is configured to hold one or more electrical over-current protection devices that route electrical power to the cabinet connection contacts.

Another embodiment provides a method of assembling the above-described power distribution system. The method comprises positioning the platform in a target location of the system and attaching the platform to one end of one or more electrical cabinets of the system.

BRIEF DESCRIPTION OF DRAWINGS

Embodiments of the disclosure are better understood from the following detailed description, when read with the accompanying FIGUREs. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

The following merely illustrate principles of the invention. Those skilled in the art will appreciate the ability to devise various arrangements which, although not explicitly described or shown herein, embody the principles of the invention and are included within its scope. Furthermore, all examples and conditional language recited herein are principally intended expressly to be only for pedagogical purposes to aid in understanding the principles of the invention and the concepts contributed by the inventor(s) to furthering the art, and are to be construed as being without limitation to specifically disclosed embodiments and conditions. Moreover, all statements herein reciting principles, aspects, and embodiments of the invention, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1:
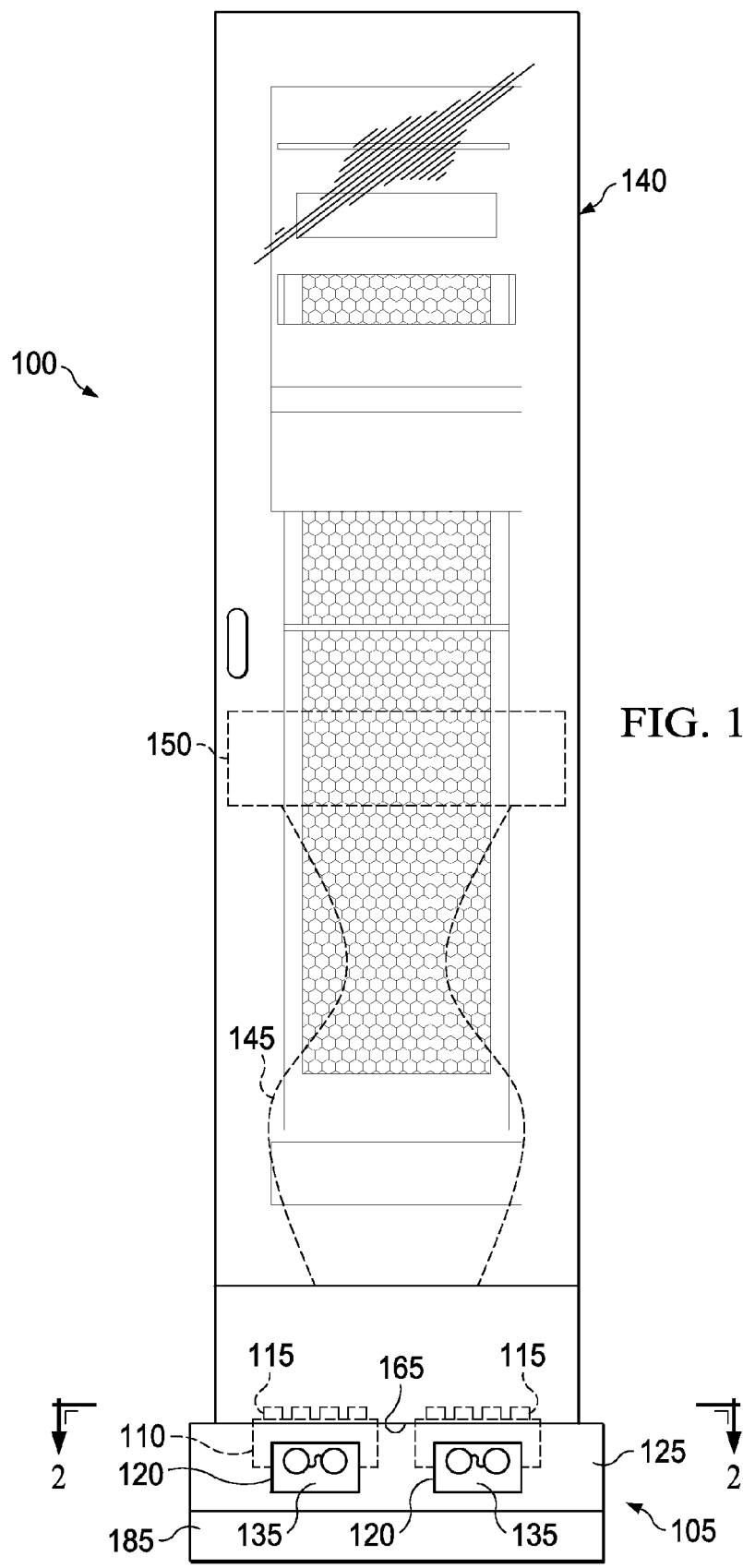
FIG. 1 shows a front view of an example embodiment of a power distribution system of the disclosure.
Figure 2:
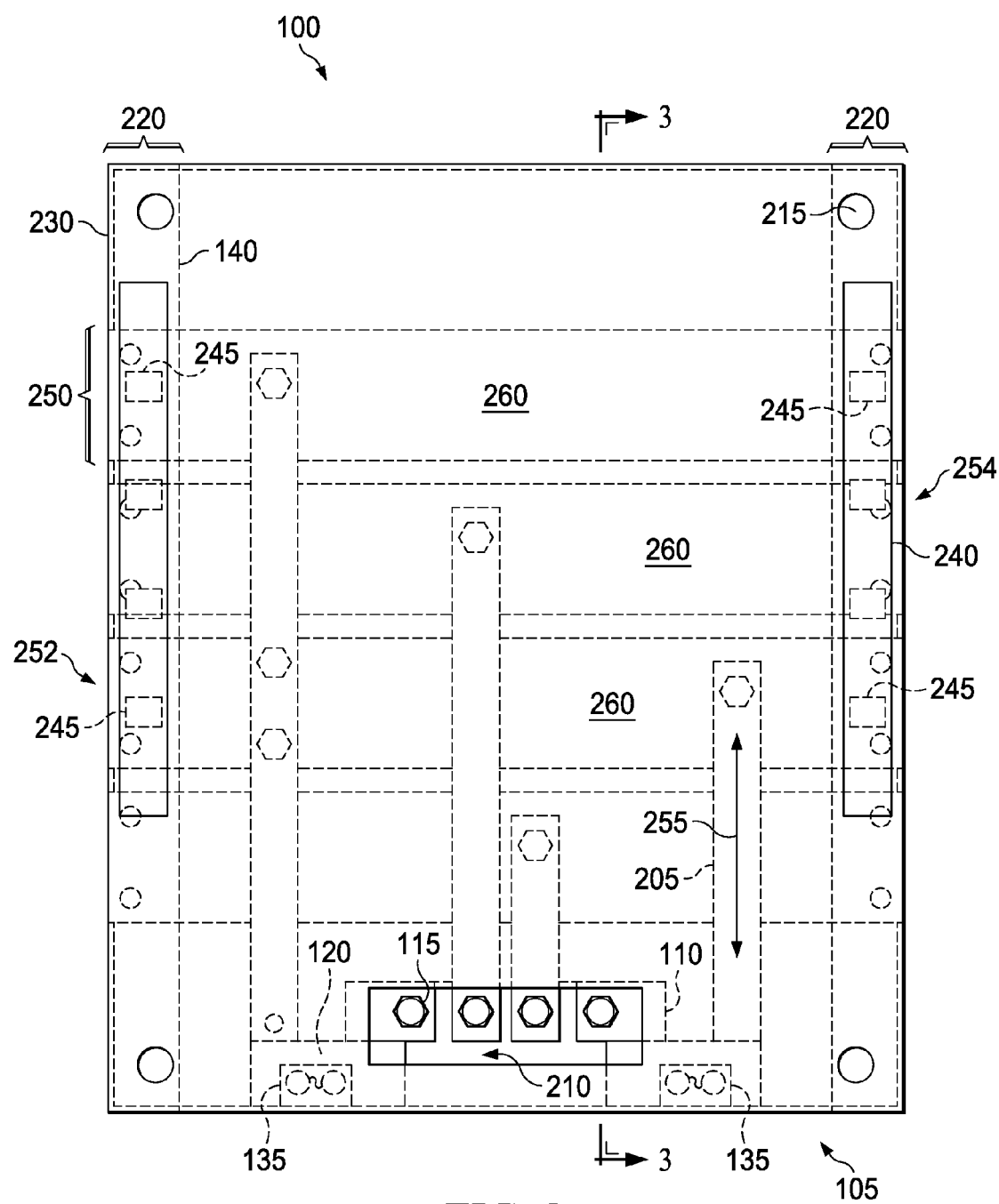
FIG. 2 shows a plan view of the example power distribution system of FIG. 1 through view line 2-2 in FIG. 1.
Figure 3:
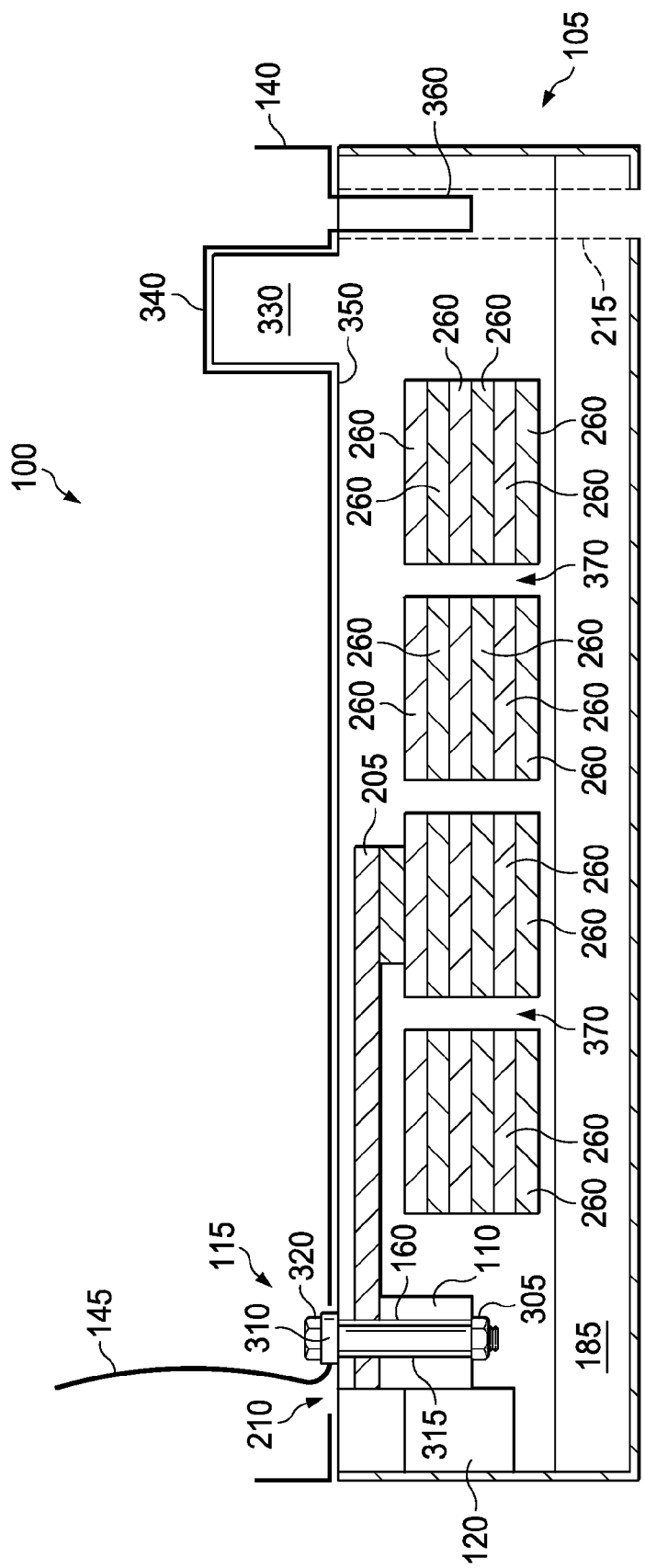
FIG. 3 shows a detailed cross-sectional view of the power distribution system depicted in FIG. 3 view line 3-3 in FIG. 2.

One embodiment is a power distribution system. FIG. 1 shows a front view of an example embodiment of the power distribution system 100 of the disclosure. FIG. 2 shows a plan view of the power distribution system 100 through view line 2-2 in FIG. 1. FIG. 3 shows a detailed cross-sectional view of the power distribution system 100 through view line 3-3 in FIG. 2.

The power distribution system 100 comprises a platform 105 having one or more electrical connections 110 each with cabinet connection contacts 115. The platform 105 also comprises one or more receptacles 120 in an outer surface 125 of the platform 105. Each receptacle 120 is configured to hold one or more electrical over-current protection devices that route electrical power to the cabinet connection contacts 115.

Some embodiments of the platform 105 further include at least one power tap 205 connected to at least one of the electrical connections 110. For example the power tap 205 can be or include one or more bus bars or wires.

Some embodiments of the platform 105 can also include at least one over-current protection device 135 located in one of the receptacles 120. Example over-current protection devices 135 include fuses or circuit-beaker devices.

Embodiments of the power distribution system 100 can further include one or more electrical cabinets 140 attached to the platform 105. Electrical feed connections 145 (e.g., wires) from each electrical cabinet 140 can be interconnected to at least one of the cabinet connection contacts 115. For instance, the over-current protection devices 135 can be removed during cabinet installation, thereby isolating the connections 145 from DC power while load connections are made. Once connections are made and the cabinet installation is completed, the over-current protection devices 135 can be inserted into the receptacles 120 to thereby apply power to the cabinet 140 including electrical component modules 150 (e.g., server equipment) housed therein.

Some embodiments of the cabinets 140 are configured such that when attached to the platform 105 the electrical feed connections 145 are located adjacent to the cabinet connection contacts 115 to facilitate their interconnection. In some cases, the interconnections between the electrical feed connections 145 and the cabinet connection contacts 115 include a fastener 305 that passes through an opening in an end 310 of one of the electrical feed connections 145 and through a termination hole 315 in each of the cabinet connection contacts 115. The interconnection can further include a cap 320 secured to an end of the fastener 305. For instance, the faster 305 can be a bolt or other threaded rod and the cap 320 can be a nut that screws onto the bolt. In some preferred embodiments, the cap 320, the fastener 305, or both, are accessible after the cabinet 140 is installed so that, e.g., the interconnections can be periodically reset or inspected without having to disassemble the system 100. For instance, the platform-attached end of the cabinet 140 can have an opening 210 through which the cabinet connection contacts 115, the fastener 305 and the cap 320 can be accessed.

As illustrated for the embodiments shown in FIGS. 1-3 the platform 105 is configured to support the target electrical cabinet 140 of the system 100. In embodiments of the system 100 which includes such a target electrical cabinet 140, the platform 105 can be attached to the bottom end 165 of the electrical cabinet. The electrical feed connections 145 of the electrical cabinet 140 can be coupled, via the cabinet connection contacts 115, to at least one of a source or return electrical connection 110 of the platform 105, which in some cases can be located under the electrical feed connections 145.

In some cases, having a floor-mounted platform 105 and the cabinet 140 attached thereon facilitates the use of lower cost metals, such as aluminum, for the bulk of the bus work of the system 100 by making the bolted joints accessible for inspection and maintenance. It is advantageous to use lighter metals such as aluminum, which can be about an order of magnitude less cost than other metals, such as copper, with no sacrifice in efficiency, safety or reliability of the system 100.

Figure 4:
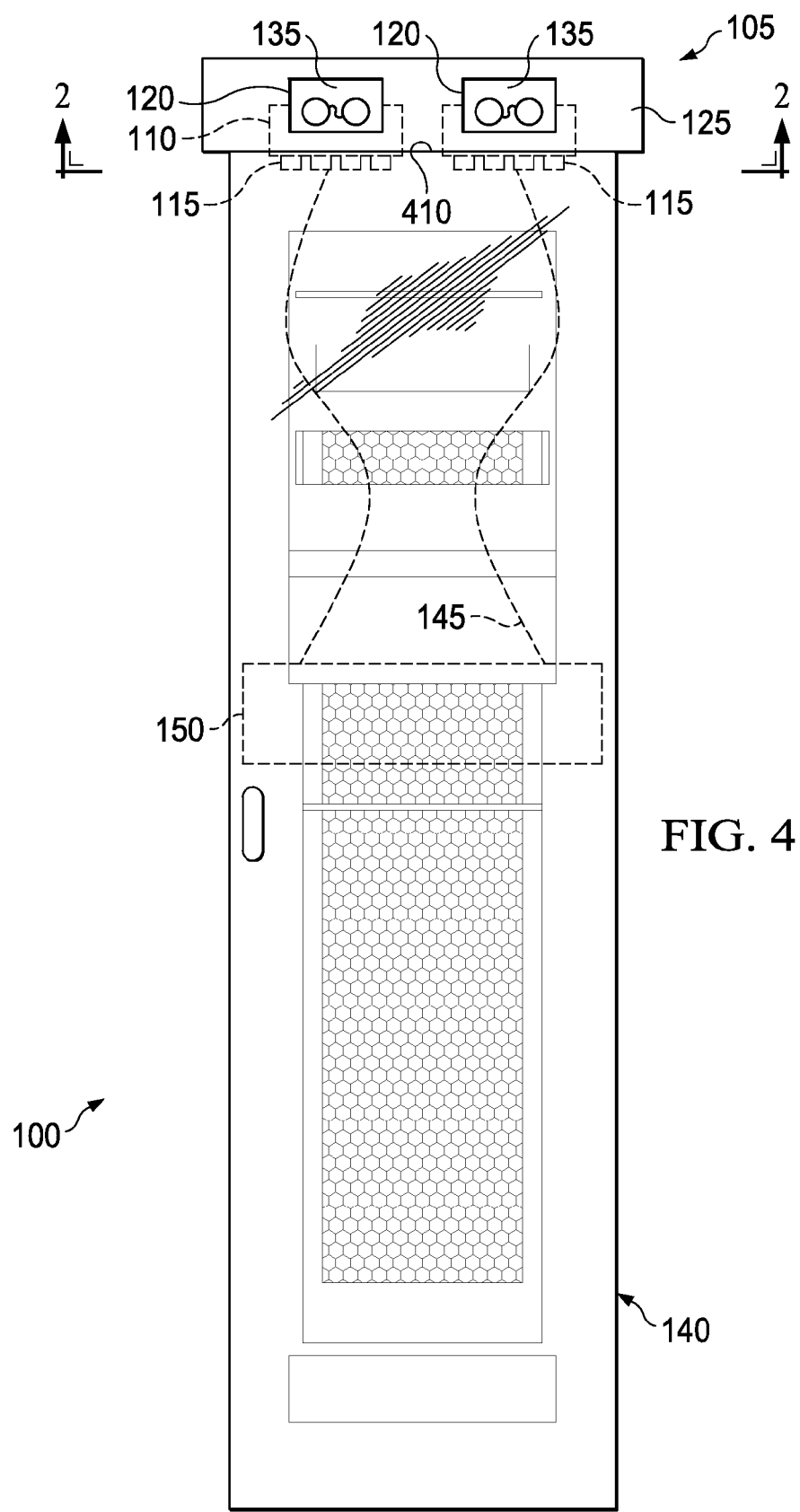
FIG. 4 presents a front view of another example embodiment of a power distribution system of the disclosure.

In other embodiments, however, the platform 105 is configured to rest on top of a target electrical cabinet 140 of the system 100. Such an embodiment is shown in FIG. 4 which presents a front view that is analogous to the view shown in FIG. 1. In embodiments of the system 100 which include such a target electrical cabinet 140, the platform 105 can be attached to the top end 410 of the electrical cabinet. Electrical feed connections 145 of the electrical cabinet 140 can be coupled, via the cabinet connection contacts 115, to at least one of a source or return electrical connection 110 of the platform 105, which in some cases can be located above the electrical feed connections 145.

In some embodiments, the platform 105 further includes alignment structures 330 (FIG. 3) configured to fit corresponding alignment structures 340 located on an outer surface 350 (e.g., a surface on the bottom end 165 or top end 410) of a target electrical cabinet 140.

In some embodiments, the platform 105 further includes hold-down structures 215 (FIGS. 2, 3) configured to anchor the platform 105 to a floor that the platform 105 is mounted on. For instance, the hold-down structures 215 can incorporate the cabinet's 140 hold down structures 360 (e.g., Zone 4 earthquake survivability compliant structures) into the platform's 105 hold-down structures 215. For instance, the hold-down structures 215 can include through-holes positioned substantially in corners of the platform, that, e.g., are aligned with the cabinet's 140 hold down structures 360. For instance, the hold-down structures 215 can include earthquake adapter elements that allow the corners of the platform to accommodate different earthquake anchor hole patterns and accommodate broken or mis-drilled holes.

As illustrated in FIG. 1, in some embodiments, the platform 100 further includes a base 185 that holds the electrical connections 110 and receptacles 120 at least above a floodzone-compliant height (e.g., 6" in some cases) of a floor that the platform 105 is mounted on.

As illustrated in FIG. 2 the platform 105 can further includes one or more planar lateral surface tracks 220 located along a perimeter 230 of the platform 105. In some cases, the tracks 220 are configured to support a cooling apparatus 240 (e.g., an in-line cooler) thereon, or, the cabinet 140 thereon (not shown). In some preferred embodiments, to facilitate assembly of the system 100, the tracks 220 are configured to support wheels 245 of the cooling apparatus 240 (or wheels of the cabinet 140, not shown). For instance, the cooling apparatus 240 (or the cabinet 140) can be rolled onto the platform 105 via wheels 245 that land on the tracks 220 and then the wheels 245 can be raised so that the cooling apparatus 240 (or cabinet 140) rests flat on the tracks 220. One skilled in the art would appreciate how the tracks 220 could similarly be used to facilitate disassembly of the system 100, e.g., by rolling the cooling apparatus 240 (or cabinet 140) off of the platform 105.

In some embodiments, such as shown in FIG. 2, the platform further includes a lateral passageway 250 for one or more interconnection DC bus bars, the passageway 250 traversing from one side 252 to another side 254 of the platform 105. In some configurations of the platform 105, such as shown in FIG. 2, the side and 252 and other side 254 can be located on opposite sides of the platform 105. In other configurations, the sides where the passageway 250 begins and ends can intersect with each other in a corner of the platform 105. In some cases, such as presented in FIG. 2, the lateral passageway 250 can be substantially perpendicular to a long axis 255 of the power taps 205 (e.g., when the power taps 205 are configured as straight bars). In some cases, the lateral passageway 250 can include ducts 370 (FIG. 3) configured to receive DC bus bars therein, although in other cases, the lateral passageway 250 can be a planar surface of the platform that the DC bus bars lay on.

In some embodiments of the platform 105 that includes one or more interconnection DC bus bars 260 on the lateral passageway 250, the interconnection DC bus bars 260 can be connected to a power tap 205 that in turn is connected to the electrical connections 110 of the platform 105 (e.g., source or return electrical connections). The interconnection DC bus bars 260 facilitate the electrical connection between cabinets 140 on the same or different platforms 105. For instance, in some cases interconnection DC bus bars 260 extend to sides 252, 254 of the platform 105 such that the bus bars 260 can contact interconnection DC bus bars 260 of a second platform (not shown) that is locatable laterally adjacent to the platform 105.

In some cases, such as when the platform 105 includes the planar lateral surface tracks 220, the interconnection DC bus bars 260 can be located in a lateral pathway 250 that includes a duct 370 that runs under the track 220. As illustrated in FIG. 3 the ducts 370 could be configured accept a stack of bus bars 260. In some embodiments, the ducts 370 can include insulation to electrically isolate the bus bars 110 from the platform 105.

Placing the interconnection DC bus bars 260 within the perimeter 230 of the platform 105, such as shown in FIGS. 1 and 2, makes for a compact installation, but may not give optimal access to the interconnections that couple the DC bus bars 260 of different platforms 105 together, because in some cases, these interconnections can be covered by the cabinet 140, once installed.

Figure 5:
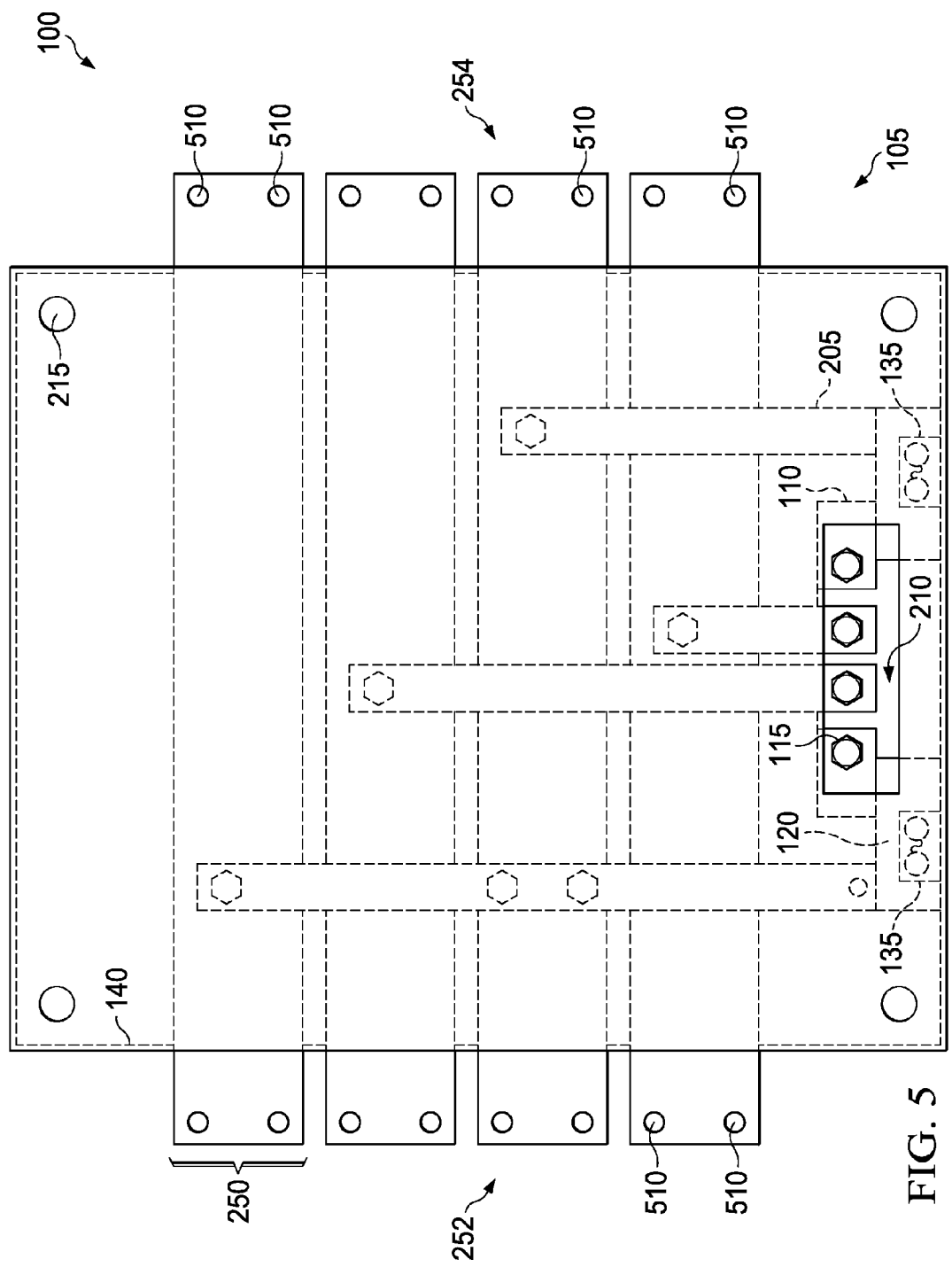
FIG. 5 presents a plan view of another example power distribution system that is analogous to the view shown in FIG. 2.

Therefore in some embodiments of the platform 105 that include interconnection DC bus bars 260, the interconnection DC bus bars 260 can extend outside of the platform's 105 perimeter 230. An example of such an embodiment is depicted in FIG. 5 which presents a plan view that is analogous to the view shown in FIG. 2. Such embodiments are desirable in cases where one wishes to access to interconnections contacts 510 between the interconnection DC bus bars 260 of different platforms 105, e.g., for inspection or maintenance purposes. However, such a configuration can require additional space between adjacent platforms 105. In some embodiments, such additional space can be advantageously used to house a cooling apparatus, such as the cooling apparatus 240 discussed above in the context of FIG. 2.

Figure 6:
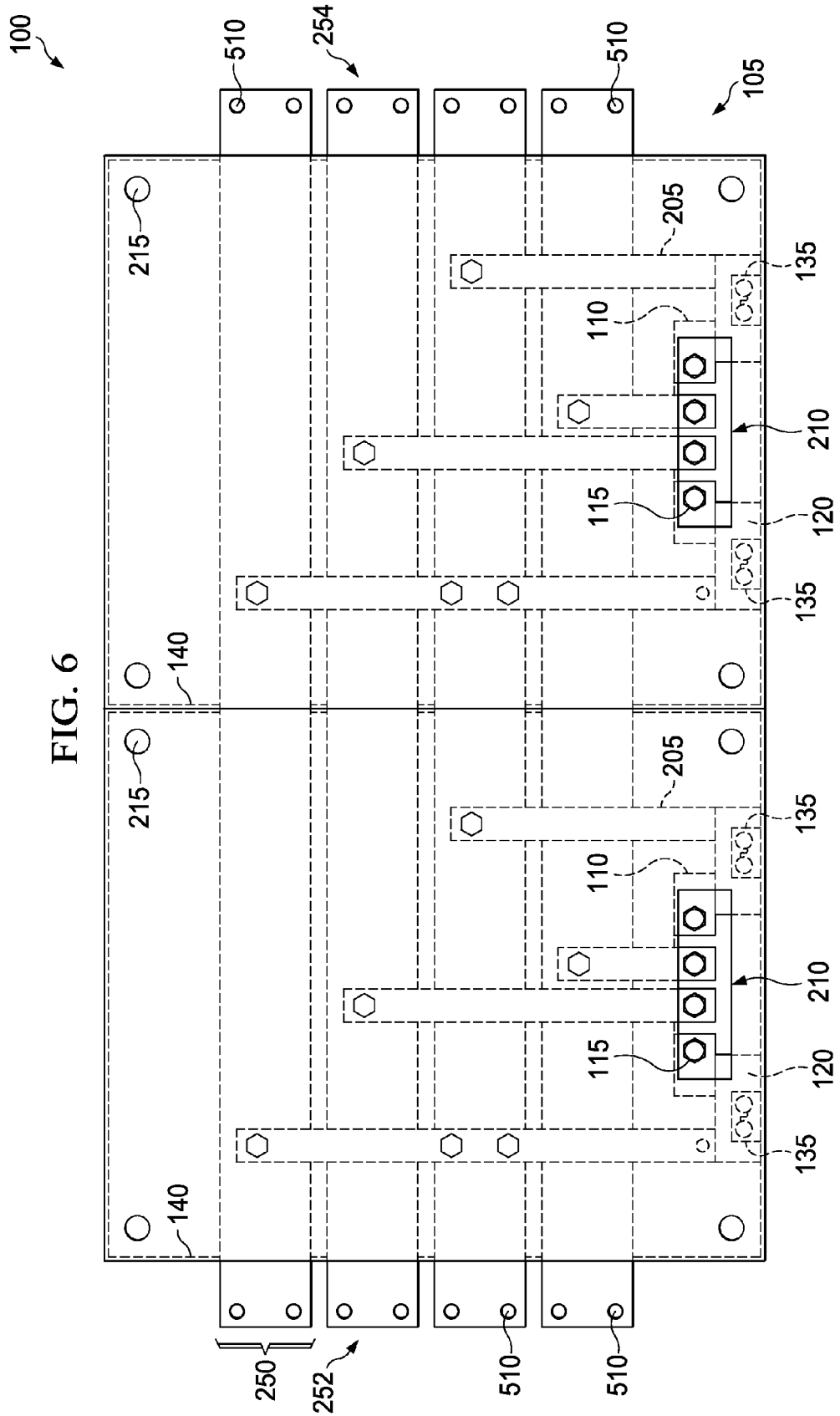
FIG. 6, presents a plan view of another example power distribution system that is analogous to the view shown in FIG. 2 or 5.

In still other embodiments, such as showed in FIG. 6, which presents a plan view that is analogous to the view shown in FIGS. 2 and 5, the platform 105 can be configured to accommodate two cabinets 140 thereon (or there under in other embodiments such as illustrated in FIG. 4). While the use of platforms 105 that support two or more cabinets increases the length of the bus bars 260 compared to single-cabinet platforms 105, such configurations can significantly reduce the number of bus bar interconnections required, thereby improving overall reliability. In such embodiments, DC bus bars 260 can extend from one side 252 to the opposite side 254 of the platform 105. Power taps 130 connected to the DC bus bars 260 and to the cabinet connection contacts 115 cooperate to transfer power to and between the cabinets 140. As further shown in FIG. 6, in such configurations the DC bus bars 260 can also extend beyond the perimeter 230 of the dual-cabinet platform 105 to facilitate forming interconnections that are easy to inspect and maintain.

Based on the preceding examples, one skilled in the art would understand that in some embodiments of the system 100, the platform 105 could be one of a plurality of modular platforms of the system 100. Modularity facilitates the mass production of many similar elements to accommodate different power distribution system configurations for different data centers. Modularity also offers the ability to provide smaller, more physically manageable size elements, easing installation and lowering costs.

For instance, in such embodiments, an adjacent one or more of the modular platforms 105 can be configured to be electrically connected through interconnection DC bus bars 260 that are attachable to each of the modular platforms. In some cases, the modular platforms 105 can be identically dimensioned and configured to facilitate mass production at low cost. In some cases, again to facilitate mass production at low cost, the interconnection DC bus bars 260 can also be modular with identical dimensions and configurations of termination holes.

The platform 105 can be adapted to be used with other embodiments of the cabinet, bus bars (including stacks of bus bars) and other components as discussed in the above-identified provisional patent applications as well as the following non-provisional patent applications: U.S. patent application Ser. No. 12/775,846 to Edward Fontana, Paul Smith and William England entitled, "Stack of bus bars for a power distribution system"; U.S. patent application Ser. No. 12/775,882 to Edward Fontana, Paul Smith, Richard Hock and William England entitled, "A cabinet for a power distribution system"; U.S. patent application Ser. No. 12/775,915 to Edward Fontana, entitled, "A cabinet for a high current power distribution system"; U.S. patent application Ser. No. 12/775,954 to Edward Fontana and Paul Smith entitled, "Thermal extension structures for monitoring bus bar terminations," all of which are incorporated herein in their entirety.

Another embodiment of the disclosure is a method of assembling the power distribution system. For example, the assembly can be performed at an installation site of the system 100. The method can be used to assemble any of the power distribution systems 100 discussed in the context of FIGS. 1-6 herein.

Figure 7:
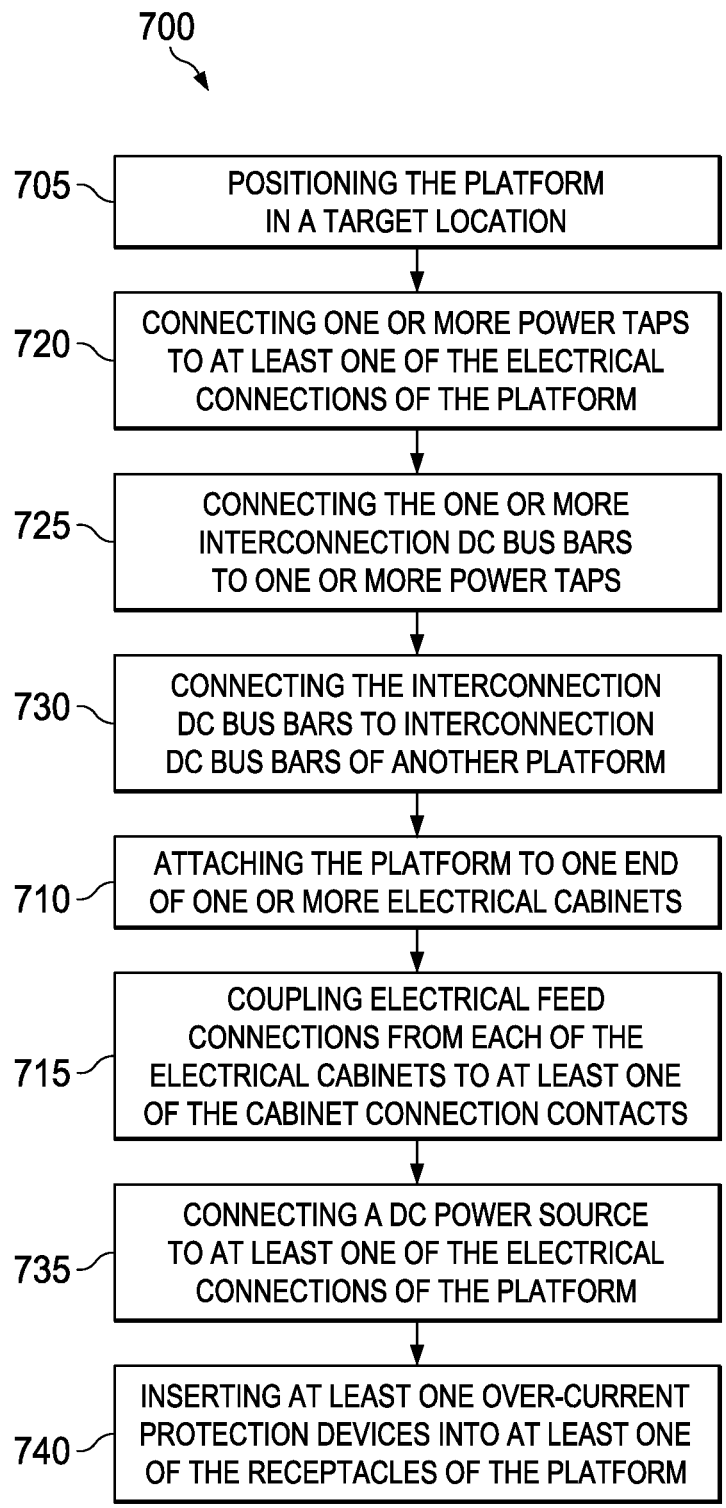
FIG. 7 presents a flow diagram of an example embodiment of a method of assembling a power distribution system of the disclosure, such as any of the example systems depicted in FIGS. 1-6.

FIG. 7 presents a flow diagram of an example embodiment of selected steps in the method 700 of assembling the power distribution system. With continuing reference to FIGS. 1-7, the method 700 comprises a step 705 of positioning the platform 105 in a target location of the system 100, and a step 710 of attaching the platform 105 to one end (e.g., a bottom end 165 or a top end 170) of one or more electrical cabinets 140 of the system 140. In some cases, such as when the combination of platform 105 and cabinet 140 is heavy, the platform 105 can be positioned in the target location and then the platform 105 can be attached to the cabinets 140. In other cases, such as when the system 100 is partially assembled in a location remote from the target location, the platform 105 can be first attached to the cabinet and then positioned in the target location.

One skilled in the art would understand that additional steps would be needed to complete the installation process. For instance, some embodiments the method 700 can also include a step 715 of electrically coupling electrical feed connections 145 from each of the electrical cabinets 140 to at least one of the cabinet connection contacts 110. In some preferred embodiments, the coupling step 715 is done after the attachment step 710.

Some embodiments the method 700 can further include a step 720 of connecting one or more power taps 205 to at least one of the electrical connections 110 of the platform 105. The method can also include a step 725 of connecting the one or more interconnection DC bus bars 260 to the one or more power taps 205. In some preferred embodiments, to facilitate access to the platform, steps 720 and 725 are conducted before the attachment step 710.

Some embodiments of the method 700 further include a step 730 of connecting the interconnection DC bus bars 260 to interconnection DC bus bars 260 of another platform of the system 100 that is located adjacent to the platform 105. In some preferred embodiments, the interconnection step 730 can be done after connecting steps 720 and 725.

Still other embodiments of the method can include a step 735 of connecting a DC power source to at least one of the electrical connections 110 of the platform 105. In some preferred embodiments, for safety considerations, step 735 is conducted after steps 705-730.

Some embodiments of the method 700 also include a step 740 of inserting at least one over-current protection device 135 into at least one of the receptacles 120 of the platform 105. In some preferred embodiments, again for safety considerations, step 740 is conducted after 735.

One skilled in the art would understand that additional steps could be performed to complete the system's 100 installation. Examples of such additional steps are provided in the provisional and non-provisional patent applications cited elsewhere herein and incorporated by reference in their entirety.

Although the embodiments have been described in detail, those of ordinary skill in the art should understand that they could make various changes, substitutions and alterations herein without departing from the scope of the disclosure.

What is claimed is:

1. A power distribution system comprising:
    a platform having:
        one or more electrical connections each with cabinet connection contacts, and
        one or more receptacles in an outer surface of the platform, each receptacle configured to hold one or more electrical over-current protection devices that route electrical power to the cabinet connection contacts, wherein:
    the platform further includes a lateral passageway for one or more interconnection DC bus bars, the passageway traversing from one side to another side of the platform,
    one or more interconnection DC bus bars are located on the lateral passageway, wherein the interconnection DC bus bars are connected to a power tap that is connected to the electrical connections of the platform, and
    the interconnection bus bars extend to sides of the platform such that the interconnection bus bars can contact interconnection DC bus bars of a second platform that is locatable laterally adjacent to the platform.

2. The power distribution system of claim 1, further including a cabinet, wherein the platform is attached to a bottom end of the cabinet, and, electrical feed connections of the cabinet are coupled, via the cabinet connection contacts, to at least one of a source or return electrical connection of the platform located under the electrical feed connections.

3. The power distribution system of claim 1, wherein the platform further includes alignment structures configured to fit corresponding alignment structures located on an outer surface of a cabinet.

4. The power distribution system of claim 1, wherein the platform further includes hold-down structures configured to anchor the platform to a floor that the platform is mounted on.

5. The power distribution system of claim 4, wherein the hold-down structures include through-holes positioned substantially in corners of the platform.

6. The power distribution system of claim 1, wherein the platform further includes a base that holds the electrical connections and receptacles at least above a flood-zone-compliant height above a floor that the platform is mounted on.

7. The power distribution system of claim 1, wherein the platform further includes one or more planar lateral surface tracks located along a perimeter of the platform.

8. The power distribution system of claim 1, wherein the platform is located above a cabinet of the system.

9. The power distribution system of claim 1, wherein the interconnection between any of the electrical feed connections and the cabinet connection contacts can be periodically reset or inspected without taking the system out of service.

10. The power distribution system of claim 1, wherein the electrical connections are held at a prescribed height above a floor that the platform is located on.

11. The power distribution system of claim 1, wherein the electrical connections, the receptacles, the interconnection DC bus bars are modular elements that can be inter-changeably used in different ones of the platform.

12. The power distribution system of claim 1, wherein the platform is located under a floor.

* * * * *